United States Patent
Abbasi et al.

(10) Patent No.: US 12,228,493 B2
(45) Date of Patent: Feb. 18, 2025

(54) MICROFLUIDIC IMPEDANCE CYTOMETRY APPARATUS

(71) Applicant: Pratimesh Labs Pvt. Ltd., New Delhi (IN)

(72) Inventors: Usama Ahmed Abbasi, Bengaluru (IN); Nitin C M, Bangalore North (IN); Sushant Kumar, Bangalore North (IN); Prakhar Jain, Bhilai (IN)

(73) Assignee: MICROX LABS INC., Wilmington, DE (US)

( * ) Notice: Subject to any disclaimer, the term of this patent is extended or adjusted under 35 U.S.C. 154(b) by 305 days.

(21) Appl. No.: 17/963,386

(22) Filed: Oct. 11, 2022

(65) Prior Publication Data
US 2023/0358663 A1 Nov. 9, 2023

(30) Foreign Application Priority Data
May 8, 2022 (IN) .............................. 202211026597

(51) Int. Cl.
*G01N 15/10* (2024.01)
*G01N 15/1031* (2024.01)

(52) U.S. Cl.
CPC . *G01N 15/1031* (2013.01); *G01N 2015/1006* (2013.01); *G01N 2015/1029* (2024.01)

(58) Field of Classification Search
CPC ....... G01N 15/1031; G01N 2015/1006; G01N 2015/1029; G01N 15/0266; G01N 2015/1027; G01N 2015/1024; G01N 15/1023
See application file for complete search history.

(56) References Cited

U.S. PATENT DOCUMENTS

| | | | |
|---|---|---|---|
| 7,420,360 B1 * | 9/2008 | Roos ...................... | G01N 15/13 324/71.4 |
| 10,267,720 B2 | 4/2019 | Spencer et al. | |
| 2002/0140414 A1 * | 10/2002 | Sohn ................... | G01N 15/1023 324/71.4 |
| 2012/0194167 A1 * | 8/2012 | Fraikin ................... | G01N 33/18 324/71.4 |
| 2012/0211084 A1 * | 8/2012 | Weitz ................ | B01F 33/30351 137/561 A |
| 2022/0034781 A1 | 2/2022 | Morgan et al. | |

* cited by examiner

*Primary Examiner* — Jermele M Hollington
*Assistant Examiner* — Zannatul Ferdous
(74) *Attorney, Agent, or Firm* — Alley IP

(57) ABSTRACT

A microfluidic impedance cytometry apparatus, for position determination and impedance measurement of particle/s in a fluid carrying particles, comprising: a microfluidic impedance flow channel for allowing flow of said fluid; an upstream section; a downstream section; a sensing region to receive said channeled fluid, to sense one or more parameters of said fluid, said sensing region comprising one or more sets of pairs of electrodes, each pair forming a current path from an operative top to an operative bottom, each of said pairs being formed by an operative top electrode and an operative bottom electrode, electric potential being applied on said operative top electrode/s, each electrode for a particular pair being parallel-aligned and being symmetric, with respect to each other, same positive electric potential being applied on each of said top electrodes and each of said bottom electrodes is virtually grounded, for a pair; and a configuration of amplifiers.

19 Claims, 14 Drawing Sheets

FIG. 5

| Position vs. amplitude (4 pair electrode) | | | |
|---|---|---|---|
| | 6 micron | 5 micron | 4 micron |
| a1 | -0.09688 | -0.09812 | -0.09909 |
| a2 | 1.028 | 1.03 | 1.032 |
| $R^2$ | 0.9919 | 0.9912 | 0.9907 |

Fitted equation: $[A2 = Gd^3(1 + a1\left(\frac{2\xi}{H}\right) + a2\left(\frac{2\xi}{H}\right)^2)]$; Gain factor = 18.47695201

| Position vs. prominence (4 pair electrode) | | | |
|---|---|---|---|
| | 6 micron | 5 micron | 4 micron |
| c1 | 0.3644 | 0.3687 | 0.3723 |
| c2 | 1.814 | 1.824 | 1.833 |
| c3 | -1.497 | -1.509 | -1.518 |
| $R^2$ | 0.9996 | 0.9997 | 0.9997 |

Fitted equation: $[P = c1 + c2\left(\frac{2\xi}{H}\right)^2 + c3\left(\frac{2\xi}{H}\right)^4]$

FIG. 9

| Position vs. amplitude (5 pair) | | | |
|---|---|---|---|
| | 6 micron | 5 micron | 4 micron |
| a1 | -0.07688 | -0.07816 | -0.08 |
| a2 | 1.024 | 1.027 | 1.027 |
| $R^2$ | 0.992 | 0.9913 | 0.9909 |

Fitted equation: $A2 = Gd^3\left(1 + a1\left(\frac{2z}{H}\right) + a2\left(\frac{2z}{H}\right)^2\right)$ Gain factor=18.46673317

| Position vs. prominence (5 pair) | | | |
|---|---|---|---|
| | 6 micron | 5 micron | 4 micron |
| c1 | 0.362 | 0.3663 | 0.3698 |
| c2 | 1.822 | 1.832 | 1.841 |
| c3 | -1.507 | -1.518 | -1.529 |
| $R^2$ | 0.9984 | 0.9985 | 0.9986 |

Fitted equation: $P = c1 + c2\left(\frac{2z}{H}\right)^2 + c3\left(\frac{2z}{H}\right)^4$

MICROFLUIDIC IMPEDANCE CYTOMETRY APPARATUS

RELATED APPLICATIONS

This application claims priority under 35 U.S.C. § 119 to Indian Application 202211026597, filed May 8, 2022, incorporated by reference herein in its entirety.

FIELD

This invention relates to the field of biomedical engineering. Particularly, this invention relates to the field of cytometry. Specifically, this invention relates to a microfluidic impedance cytometry apparatus.

BACKGROUND

Impedance cytometry is the measurement of the dielectric properties of cell using single or multiple frequencies. Recent advancement in the impedance cytometry research shows that different type of cells present in the human blood can be distinguished using multiple frequencies. The advantage of impedance cytometry over optical measurement is that the magnitude of the impedance is less dependent on the position of the particle. Cytometry using optics requires a sheath flow to maintain the cells in the center of the channel which results in huge wastage of fluid and make the system complex, bulky and costly.

Cytometry is the enumeration of different type of cells and various other properties such as size of the cells, existence of certain protein present on the membrane of the cells and various other properties such as different nuclei shape presents inside the leukocytes. However, impedance cytometry offer advantage compared to the optical measurement because the signal is least dependent on the position of the particle. Therefore, the measurement in impedance cytometry can be done without any sheath fluid. The present innovation offer advantage in building the Complete blood cell (CBC) count instrument at PoC since the size of the instrument is drastically reduced.

The cells having membrane of different electrical conductivity can be differentiated using multiple frequencies.

The present art discloses the innovation where precise impedance measurement of the cell can be done using multiple electrodes embedded inside the microfluidic channel on top and bottom wall. According to a first prior art citation document [U.S. Pat. No. 10,267,720], the citation discusses the use of two-ground electrodes between each measurement electrode and signal electrode. In this citation, the signal electrode is an operative top electrode where potential is applied and the measurement electrode is an operative bottom electrode which is virtually grounded (at 0V). Current flow from the signal electrode to the measurement electrode is measured. Difference between the two measurement electrodes gives an antisymmetric peak signal with a secondary peak in between a global maximum and a global minimum of the peak. Here, peak is defined as an electronic signal, obtained, due to passing of a particle from a first electrode to a last electrode.

The electronic signal varies with position of the particle, in a Z-direction (where is the axis defined, please show), for a same size of the particle. Therefore, to precisely measure diameter of the particle, measurement of position of the particle in Z-direction is very important. The electronic signal varies with the position in the Z-direction because current density is non-uniform in the Z-direction. The current density is relatively higher near to an edge of the electrodes and relatively lower at a center of the channel.

According to a first prior art citation document [U.S. Pat. No. 10,267,720], the citation discusses that ratio of primary peak to secondary peak which can be used to correlate the position of the particle in a vertical direction and thereafter, the correction in the diameter of the particle can be made. The disadvantage of the first prior art citation is the magnitude of the secondary peak is very low and for smaller size particle less than 4 micron the secondary peak is almost buried in the noise for a cross section of 30 µm×30 µm and electrode width of 30 µm and even with the edge to edge separation of two consecutive electrodes less than 10 microns the signal to noise ratio (SNR) of the secondary peak is not good. Further, enhancement in the secondary peak magnitude can achieved by reducing the height of the channel. However, this increases the chance of clogging of the microfluidic channel because the smaller particle may block the sensing region.

The second prior [US20220034781A1] art citation discusses that "increasing the sensitivity of the microfluidic apparatus" for counting particle less than 2 micron. The major application of second prior art is to count the bacteria of size less than 1 micron in wider channel.

The electrode, fabricated in the first prior art, always has some degree of misalignment and slight variation in the geometry of electrode because of which the peaks are not exactly antisymmetric and the offset current is not zero. The offset current is defined as the difference between the current coming from the bottom of the two signal electrodes when no particle is present in between the electrode. Since, the offset current is not zero and two thermal noise coming from the two bottom signal electrodes, when subtracted, is of higher magnitude the impedance measurement of sub-micron size particle becomes challenge. The second prior art discloses the idea of applying two equal voltages of same frequency but with 180-degree phase difference. Two negative voltage is applied to any top two electrode and two positive voltage is applied on the other two top electrodes. The two current with 180-degree phase angle is summed using summing amplifiers and similarly the other two current is summed from the other two pair of electrodes in the same fashion. The output, from the two summing amplifiers, is subtracted using Differential amplifiers (DA). Since the current is subtracted thrice the value of the offset voltage (the final output from the DA when no particle is present) is always less compared to the first prior art. Ideally, the offset voltage should be zero when there is no misalignment and the two-electrode geometry configuration is same.

The second prior art citation does not disclose how to determine the position of the particle and the FEM analysis shows that that peak impedance signal varies with the position of the particle in the Z-direction. The first prior art citation and the second prior art citation is completely different since the voltage is of same phase in first prior art citation but in second prior art citation, they have used voltage of opposite magnitude. The first prior art citation and the second prior art citation, therefore, cannot be combined. Also, in second prior art the value of the summing current with opposite phase is not zero theoretically because the two electric field is not exactly same. The first and the last electrode will have the same electric field distribution and the middle two electrodes will have the same electric field distribution provided the electrode geometry and separation is same for all the four pair of electrodes.

SUMMARY

There is a need for an apparatus and a method where position of the particle can be measured and thereafter correction in the diameter of the particle can be made. The present art discusses how to determine the position of the particle in the Y and Z-direction. The advantage of the present invention is the magnitude of the 'M' defined in the below section which is of much higher magnitude than the magnitude of the secondary peak disclosed in the patent 1.

Further, the sensitivity of the microfluidic apparatus is required to be improved compared to the second prior art citation.

The invention does not use any ground electrode and the voltage source of opposite phase. The electronic measurement system in present invention is less complicated than second prior art which require only single voltage source of same phase and same frequency. The invention also discusses how the position of the particle both in 'Y' and 'Z' can measured. The first prior art discloses the art of measuring the position of the particle in the Z-direction by correlating the simulated data after FEM analysis and the experimental raw data. The main disadvantage is it requires huge computation power. However, in the current art the value of 'M', 'A1' and 'A2' defined in the later section can be easily used to find the position of the particle in the Z-direction. The present art is computationally least expensive.

The use of more than four electrodes, preferably seven electrodes, uses inner most four electrode which makes the electric field lines more symmetrical compared to the second prior art. The reduction in the offset voltage is much improved compared to second prior art. The present invention is completely different from first prior art and second prior art.

An object of the invention is to provide a system, apparatus, and method for precise impedance measurement of particles or cells, inside a microfluidic impedance cytometry apparatus using single or multiple frequencies.

Another object of the invention is to provide a system, apparatus, and method for determining an operative vertical position of a particle (vertical position is the Z-axis, as seen in FIG. 14) which can be precisely calculated, and, thereafter, precise volume of the particle can be measured.

Yet another object of the invention is to provide a system, apparatus, and method enhancing sensitivity of detection for counting particle of size less than 1 micron.

According to this invention, there is provided a microfluidic impedance cytometry apparatus.

In at least an embodiment, of this apparatus, a microfluidic impedance flow channel comprises at least an inlet and at least an outlet opening for allowing flow of conductive liquid, the liquid may carry non-conductive particles or particle having conductivity and permittivity different from the liquid or conductivity or permittivity different from the liquid.

In at least an embodiment, of this apparatus, the apparatus comprises at least an operative top electrode provided on the apparatus' top wall and at least an operative bottom electrode provided on the apparatus' bottom wall; electric potential is applied on these top electrodes. Preferably, the apparatus comprises multiple operative top electrodes, on its top wall, and multiple operative bottom electrodes, on its bottom wall; which come in contact with the conductive liquid carrying non-conductive particle.

Corresponding top and bottom electrodes form one or more pairs which provide a current path flowing from top to bottom. When the conductive liquid, carrying non-conductive particles, passes between formed electrode pair/s, electric field lines are perturbed; thereby, resulting in change in current flowing from top to bottom. Change in the current is directly proportional to volume of the particle. However, current density between each pair is non-uniform. Therefore, the change in current is dependent on the position of the particle in a vertical direction. The current density is stronger near the edge of the electrode; therefore, the change in current is much higher when the particle is close to the edge of the electrode.

The present invention discloses a mechanism, and method, where:
 vertical position of the particle can be precisely calculated; and
 thereafter, precise volume of the particle can be measured.
 Thereafter, position of the particle along the width can be measured.

The present invention comprises at least four pairs of electrodes for position and impedance measurement of the particle.

Further, the system and apparatus also improve sensitivity of detection for counting particle of size less than 1 micron.

According to this invention, there is provided a microfluidic impedance cytometry apparatus, for position determination and impedance measurement of particle/s in a fluid carrying particles, said apparatus comprising:
 a microfluidic impedance flow channel for allowing flow of said fluid;
 an upstream section configured to channel fluid in a pre-defined direction;
 a downstream section configured to channel fluid in a pre-defined direction;
 a sensing region configured to receive said channeled fluid, between said upstream section and said downstream section, configured to sense one or more parameters of said fluid, said sensing region comprising one or more sets of pairs of electrodes, each pair forming a current path from an operative top to an operative bottom, each of said pairs being formed by an operative top electrode and an operative bottom electrode, electric potential being applied on said operative top electrode/s, each electrode for a particular pair being parallel-aligned and being symmetric, with respect to each other, same positive electric potential being applied on each of said top electrodes and each of said bottom electrodes is virtually grounded, for a pair;
 wherein, edge to edge spacing of adjacent electrode/s is at least 0.5 times of said electrode width but maximum spacing is 5 times of said electrode width;
 wherein, width of said channel is at least 1.5 times greater than its height;
 a configuration of amplifiers, wherein:
  a first summing amplifier configured to add values of current flowing from bottom first electrode and bottom second electrode to obtain a first summation value;
  a second summing amplifier configured to add values of current flowing from bottom third electrode and bottom fourth electrode to obtain a second summation value;
  a first differential amplifier configured to obtain a first difference value, comprising at least three local maxima and three local minima, over a defined time duration, using said first summation value and said second summation value;
  change in current, between electrodes, being a function of position of particle in a vertical direction (Z-direction) and volume of said particle, in said fluid, causing said change in current when said fluid comprising particles pass through said at least a pair of electrodes of said sensing electrodes; and velocity of the particle being a function of position of particle in a width direction (Y-direction) and in a vertical direction (Z-direction) for a given applied pressure of said fluid.

In at least an embodiment, each of the bottom electrode being connected to a fixed precision resistor which is grounded to act as potential divider, in that, each pair of electrodes being connected in series with a fixed resistor value which is grounded;

a second differential amplifier being configured to output a second difference value between voltage values of said first pair of electrodes and said third pair of electrodes;

a third differential amplifier being configured to output a third difference value between voltage values of said second pair of electrodes and said fourth pair of electrodes;

a fourth differential amplifier being configured to output a fourth difference value between said second difference value and said third difference value.

In at least an embodiment, said sensing region comprising at least a detection chamber being defined as volume of the region between a top electrode and its corresponding bottom electrode which, together, form a pair of electrodes.

In at least an embodiment, said sets of pairs of electrodes being odd numbers of pairs, in that, a center electrode is grounded.

In at least an embodiment, width of said sensing region being at least 1.5 times of height of said sensing region in order to focus said particle/s in an operative horizontal plane at higher flow rate (Z-plane).

In at least an embodiment, width of said channel is 4 times of height of said sensing region in order to align said particles in an operative horizontal plane (Z-plane).

The apparatus as claimed in claim 1 contains a fluid which is viscoelastic for focusing the particle/s in a Z-plane.

In at least an embodiment, each of said operative top electrodes being provided on an operative top wall of said apparatus such that said electrode being in communication with said fluid configured to pass through said impedance flow channel.

In at least an embodiment, each of said operative bottom electrodes being provided on an operative bottom wall of said apparatus such that said electrode being in communication with said fluid configured to pass through said impedance flow channel.

In at least an embodiment, each of said electrodes being fabricated by coating of photoresist (such as SU-8) with platinum electrode deposited on the silicon or the glass wafer and said electrode material being platinum or gold such that they all are in contact with the flowing fluid.

In at least an embodiment, from said three local maxima and three local minima, difference between a third extreme value and fourth extreme value gives a first (main) peak value having 'A1' value;

difference between a first extreme value and a sixth extreme value gives a second peak value having 'A2' value;

difference between a second extreme value and a fifth extreme value gives a third peak value having 'M' value; so that, amplitude difference between said 'A1' value and said 'A2' value provides a determination whether particle in said fluid is above or below a center value;

positive difference between said 'A1' value and said 'A2' value provides a determination that particle in said fluid is above or below a center value; and negative difference between said 'A1' value and said 'A2' value provides a determination that particle in said fluid is above or above a center value.

In at least an embodiment, each of said electrodes is connected to an input voltage signal, the input voltage signal being generated from a lock-in board and an output signal coming from said differential amplifier being fed to an input of said lock-in amplifier for demodulation required for impedance measurement at different frequencies, the impedance signal modulated with carrier frequency, the carrier frequency being the applied sinusoidal voltage to the electrode with sinusoidal frequency on top of the electrode, the output of said differential amplifier is the modulated signal carrying the impedance signal of the particle and the carrier frequency, the demodulation of the signal is done using said lock-in amplifier instrument to obtain impedance values at each applied frequency applied to said top electrode/s.

In at least an embodiment, a first top-electrode and a fourth top-electrode being provided positive voltage and a second top-electrode and a third top-electrode being provided negative voltage in order to obtain three local maxima and three local minima.

In at least an embodiment, a first top-electrode and a fourth top-electrode being provided with positive voltage, a second top-electrode and a third top-electrode being provided with negative potential of the same magnitude, all bottom electrodes being virtually grounded, in that, current flowing from the first bottom electrode and the third bottom electrode is summed using a first summing amplifier and current flowing from the second bottom electrode and the fourth bottom electrode is summed using another summing amplifier, and difference of the output from the two summing amplifier is found using a differential amplifier to generate the minima-maxima-minima-maxima-minima-maxima or maxima-minima-maxima-minima-maxima-minima. This configuration can be used to increase the sensitivity as well as to find the position of the particle and thereafter impedance correction can be done.

In at least an embodiment, a first top-electrode and a second top-electrode being provided positive voltage and a third top-electrode and a fourth top-electrode being provided negative voltage, with all bottom electrodes connected to resistors or virtually grounded for measurement of summation of current flowing in first bottom electrode and fourth bottom electrode and for measurement of summation of current flowing in the second first bottom electrode and third bottom electrode and thereafter the two summed currents are subtracted using the difference amplifier. This configuration generates maxima-minima-maxima-minima or minima-maxima-minima-maxima. This configuration increases the limit of detection (LOD) but cannot be utilized to find the position of the particle.

In at least an embodiment, a first top-electrode and a second top-electrode being shorted with a positive voltage applied on said first top-electrode and said second top-electrode, using only single contact pads, and a third top-electrode and a fourth top-electrode being provided two different pads for electrical connection, said third top-electrode and a fourth top-electrode being provided with same magnitude negative voltages using only single contact pads.

In at least an embodiment, said third bottom-electrode and said second bottom-electrode being shorted and said first bottom-electrode and said fourth bottom-electrode having two different contact pads for and a total of three contact pads for electrical current measurement, in that, all bottom electrodes are either virtually grounded or connected to resistor.

In at least an embodiment, at least one of said operative top electrodes being applied with a carrier signal having at-least two different frequencies ranging from 500 kHz to 30 MHz to find the size of the particle as well as the electrical cell membrane properties such as capacitance to distinguish the particle of same size but having different membrane electrical property.

In at least an embodiment, said apparatus having eight pair of electrodes where only four innermost symmetric pairs of electrodes being utilized for measurement.

In some embodiments, the microfluidic flow channel has top surface made of glass and the bottom surface is made of silicon. The side wall of the microfluidic apparatus is made of photoresist.

In some embodiments, the length of the sensing region can be from 30 micron to 600 microns for counting micron sized-particle of less than 20 microns.

In some embodiments, the height of the sensing region can be 10 microns to 100 microns.

In some embodiments, the width of the electrode can be from 10-micron 30 micron for counting sub-micron particle size.

In some embodiments, the width of the sensing region can be from 30 micron to 200 microns.

In some embodiments, the number of electrode pairs is at least 4 pair but can be increased to 7 pairs. The electrode dimension for all the pairs is same.

In at least an embodiment, the prominence of the impedance signal (the final output signal) is calculated as (1−M/A2). The value of the prominence is well correlated with the position of the particle in the vertical Z direction. The prominence is well correlated with the equation $$P = c1 + c2\left(\frac{2Z}{H}\right)^2 + c3\left(\frac{2Z}{H}\right)^4 \cdot \text{'c1', 'c2', and 'c3'}$$

is known for a fixed known geometry.

In at least an embodiment, the Z-position is substituted in the equation $$A2 = Gd^3\left(1 + a1\left(\frac{2Z}{H}\right) + a2\left(\frac{2Z}{H}\right)^2\right)$$

obtain the true diameter of the particle. Where 'd' is the diameter of the particle, 'Z' is the vertical position of the particle and 'G' is the gain factor dependent on the electronic circuit and electrode geometry.

BRIEF DESCRIPTION OF THE DRAWINGS

The invention will now be described in relation to the accompanying drawings, in which:

FIG. 5 illustrates Table 1 showing the fitting coefficient for both the equation defined in the latter section for different size of the particle;

FIG. 9 illustrates Table 2 showing fitting coefficient for both the equation 1 and 2a for different size of the particle for the electrode geometry shown in FIG. 8;

DETAILED DESCRIPTION

According to this invention, there is provided a microfluidic impedance cytometry apparatus.

The present invention relates to precise impedance measurement of a particle at multiple frequencies. The current application, of such apparatus, is mainly for enumeration of blood cells, counting of *e-coli* bacteria, impedance spectroscopy of the cancerous cells to derive electrical parameters such as conductivity and the permittivity of the particle as well as to find the electrical property of cell-membrane.

In at least an embodiment, of this apparatus, a microfluidic impedance flow channel comprises at least an inlet and at least an outlet opening for allowing flow of conductive liquid, the liquid carrying non-conductive particles.

In at least an embodiment, of this apparatus, the apparatus comprises at least an operative top electrode provided on the apparatus' top wall and at least an operative bottom electrode provided on the apparatus' bottom wall; electric potential is applied through these electrodes. Preferably, the apparatus comprises multiple operative top electrodes, on its top wall, and multiple operative bottom electrodes, on its bottom wall; which come in contact with the conductive liquid carrying non-conductive particle.

Corresponding top and bottom electrodes form one or more pairs which provide a current path flowing from top to bottom. When the conductive liquid, carrying non-conductive particles, passes between formed electrode pair/s, electric field lines are perturbed; thereby, resulting in change in current flowing from top to bottom. Change in the current is directly proportional to volume of the particle. However, current density between each pair is non-uniform. Therefore, the change in current is dependent on the position of the particle in a vertical direction. The current density is stronger near the edge of the electrode; therefore, the change in current is much higher when the particle is close to the edge of the electrode.

Figure 1A:
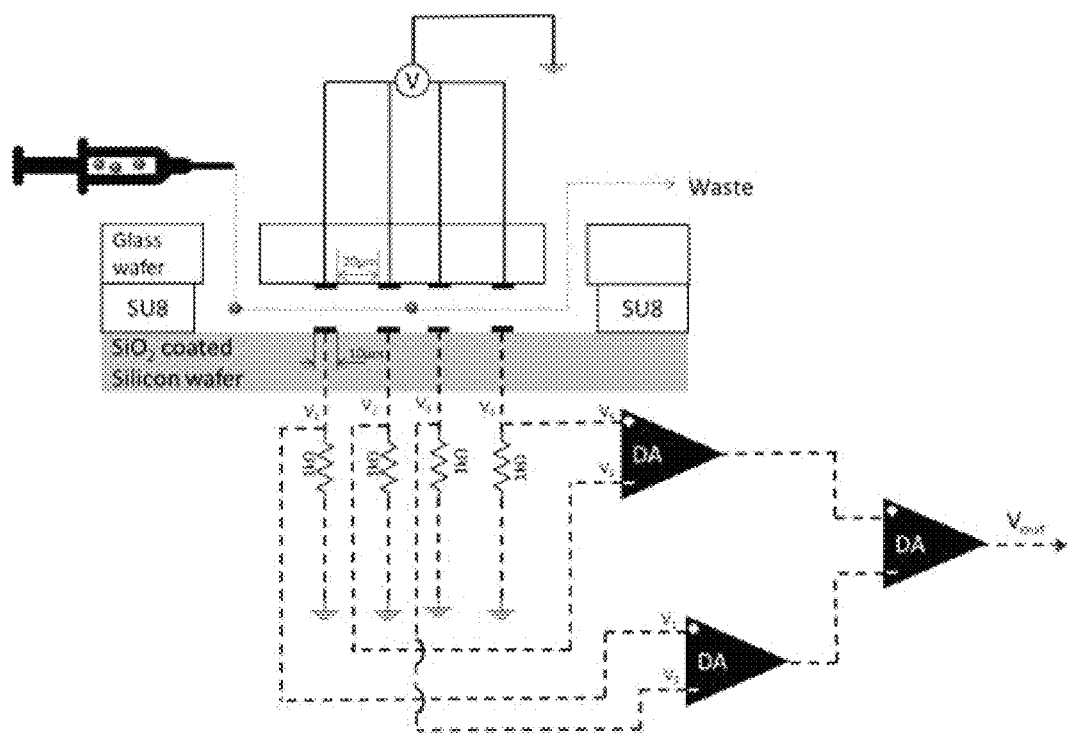
FIG. 1A shows four pair electrode having width of 10 micron with edge to edge to edge spacing of 20 microns. The current difference between first and third electrode is found using DA and the current difference between second and fourth pair is found using another DA. The outputs from the two DA is subtracted using third DA.

In preferred embodiments, the microfluidic apparatus, of this invention, is fabricated by coating of photoresist (SU-8) with platinum electrode deposited on the silicon or the glass wafer shown in FIG. 1A. The electrode material of the apparatus can be platinum or gold.

Figure 1B:
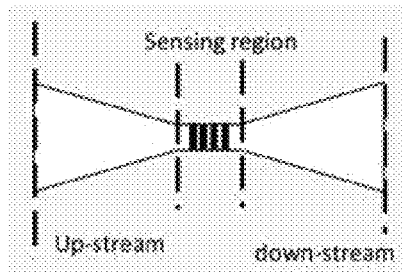
FIG. 1B illustrates a top view of the electrode with three different regions, the upstream, sensing region and downstream region. The current coming from the bottom electrode is measured using Wheatstone bridge and differential amplifier as shown in FIG. 1A.

In at least an embodiment, the microfluidic apparatus, of this invention, has three sections, as labeled in FIG. 1B: an upstream section, a sensing section, and a downstream section.

In preferred embodiments, length of the sensing section, of the apparatus, can vary from 10 micron to 600 microns with at least four pair of electrodes. The top and bottom electrodes are aligned to ensure the electric field lines are parallel and symmetric to reduce any error arising because of the misalignment of the electrode.

Figure 2:
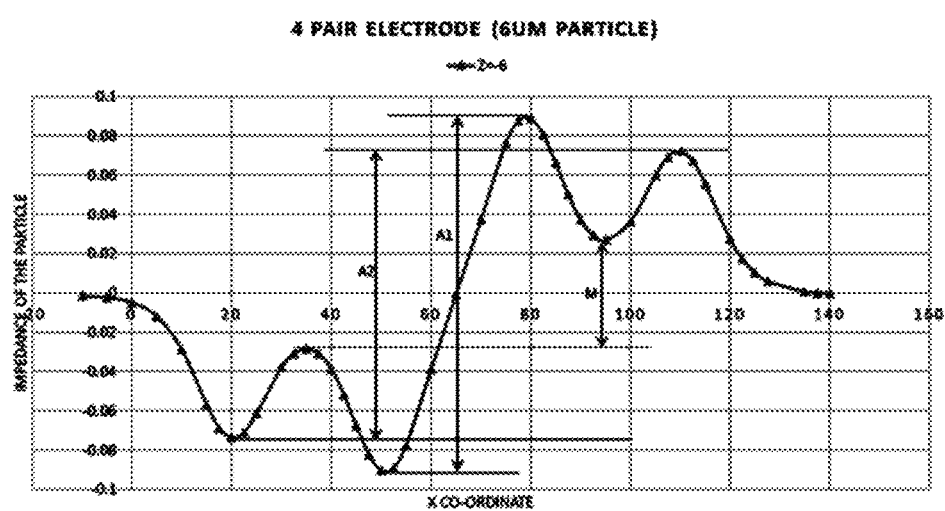
FIG. 2 illustrates Amplitude variation of the particle (the final output coming from the third DA) with respect to the x-coordinate of the particle. The impedance signal shown in the figure is for 6-micron diameter of the particle and for Z=−6 micron inside microfluidic chip with height 30 μm and width 30 μm. The center of the channel is located at (0,0,0). The amplitude of 'A1', 'A2' and 'M' is shown with the black double head straight arrow.

In preferred embodiments, width of the electrodes can be from 5 micron to 100 microns depending on the size of the particle required for counting. Edge-to-edge gap between each pair can be from 5 micron to 60 microns. High current density near the top electrode and the bottom electrode causes a variation in impedance signal magnitude. However, position of the particle can be calculated from the impedance signal, of the particle, using three factors viz. 'A2', 'M', and 'A1' as shown in FIG. 2 and as described below; thereafter, impedance value can be corrected. FIG. 2 illustrates a graph of voltage recorded, across electrodes, with respect to position; across which multiple values are obtained. For a given configuration of electrodes, this graph shows 3 maxima and 3 minima.

The sensitivity of the apparatus is defined as the ratio of minimum volume of the particle which can be counted to the volume of detection chamber. Here, detection chamber is defined as volume of the region between a top electrode and its corresponding bottom electrode which, together, form a pair of electrodes. Electrode dimensions can be decreased to increase sensitivity of the apparatus. Sensitivity of the signal, discussed in the first prior art, is limited because of the following factors:

(a) The greater electric potential cannot be applied beyond a certain value because the current voltage converter circuit will saturate and also high voltage gradient in the direction of height will degrade the electrode material.

(b) There is always a misalignment in the electrode and variation in the electrode geometry which increases the offset voltage in the electronic circuit resulting in high noise and reaching to saturation if gain of the circuit is increased.

Figure 3:
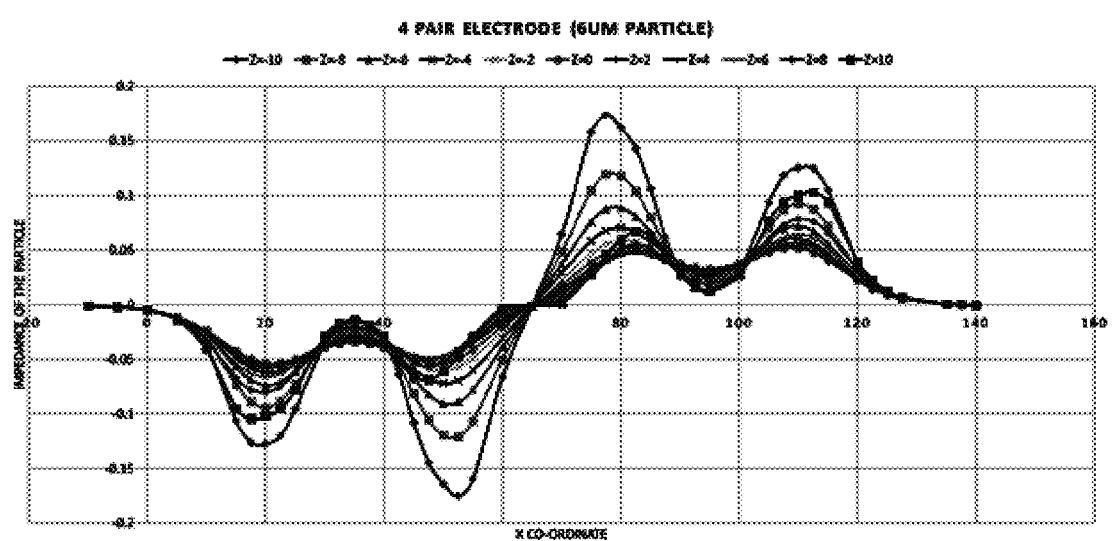
FIG. 3 illustrates impedance signal of 6-micron particle at various Z position. The impedance signal is in micro-ampere and the Z-position is in microns.

In at least an embodiment, same electric potential is applied on all the top electrodes and all the bottom electrodes is connected to a fixed resistor value which is grounded as shown in FIG. 1A. Current flowing from top to bottom is changed when a particle is nearer to a wall or is in-between the top and bottom electrode. The FIG. 1A shows four pairs of electrodes; but, in general, multiple electrodes can be fabricated. The impedance signal, of the particle, at various heights, for microfluidic apparatus, shown in FIG. 1A, is shown in FIG. 3 which clearly indicates higher impedance value when a particle is closer to the edge of the electrode. The impedance magnitude of the particle denoted as 'A2' is related to a position of the particle and a diameter of the particle described in equation 1.

$$A2 = Gd^3\left(1 + a1\left(\frac{2Z}{H}\right) + a2\left(\frac{2Z}{H}\right)^2\right) \quad (1)$$

$$P = c1 + c2\left(\frac{2Z}{H}\right)^2 + c3\left(\frac{2Z}{H}\right)^4 \quad (2a)$$

Figure 14:
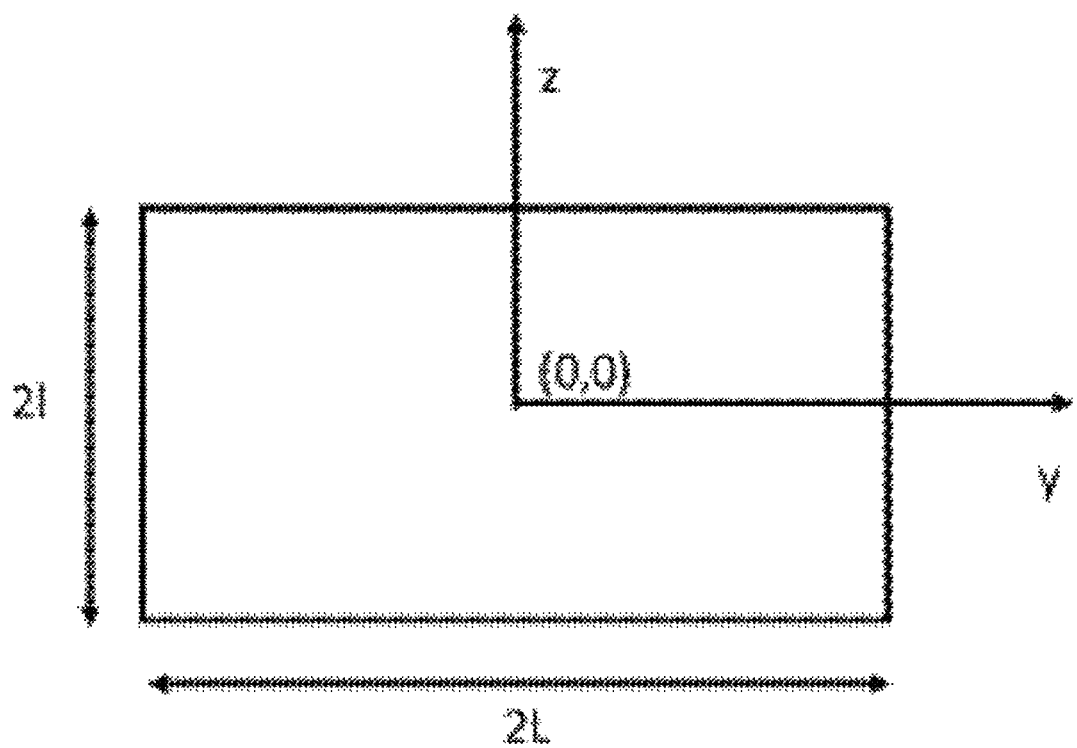
FIG. 14 illustrates a cross section of the sensing region. The axis is labelled as shown. The peak amplitude varies with the Z coordinate but independent on the Y-coordinate. The flow of fluid is in the X-direction.

Where,

A2 is the impedance magnitude of the signal,

'a1', 'a2', 'c1', and 'c2' is the fitting parameter,

Z is the vertical position of the particle shown in FIG. 14,

'd' is the diameter of the particle,

'G' is the electronic circuit gain,

'H' is the height of the channel.

The coefficient 'a1' and 'a2' is obtained after least square fit since A2 and Z is known for various Z positions for a known geometry of microfluidic apparatus and diameter of the particle after solving Laplace equation in voltage and applying the appropriate boundary conditions on the walls of the sensing region.

Here the 'P' is called prominence defined below in equation 3

$$P = 1 - \frac{M}{A2} \quad (2b)$$

The characteristic feature of the impedance signal showing M and A2 is labelled in FIG. 2.

$$U(X, Y) = \left[ (Y^2 - 1) + \sum_{n=0}^{\infty} \frac{32(-1)^n \cosh\left\{\frac{(2n+1)\pi A Z}{2}\right\}}{(2n+1)^3 \pi^3 \cosh\left\{\frac{(2n+1)\pi A}{2}\right\}} \times \cos\left\{\frac{(2n+1)\pi Y}{2}\right\} \right] \Big/ M_0 \quad \text{(3a)}$$

$$M_0 = \left[ -\frac{2}{3} + \sum_{n=0}^{\infty} \frac{128(-1)^n \tanh\left\{\frac{(2n+1)\pi A}{2}\right\}}{A\pi^5(2n+1)^5} \times \sin\left\{\frac{(2n+1)\pi}{2}\right\} \right] \quad \text{(3b)}$$

Where, $Y = y/L$, $Z = z/l$, $A = l/L$, $U = u/u_m$ and $u_m = \dfrac{\int_0^L \int_0^l u \, dx \, dz}{\int_0^L \int_0^l dx \, dz}$ FIG. 14 shows coordinate axis and definition of l and L Here, U is the scaled velocity defined as the ratio of the velocity at position 'x' and 'y' coordinate to the mean flow velocity in the sensing region.

Operative vertical position of the particle can be above or below a center of the channel. The amplitude difference between the A1 and A2 decides whether the particle is above or below the center. The positive difference between A1 and A2 indicates that the particle is below the center and the negative difference indicates that the particle is above the center of the channel. 'P' is defined as another height factor (Prominence, 'P') which can be used to calculate the position of the particle in the vertical direction.

Equation 2 relates the 'P' with the position of the particle in the vertical direction. The impedance signal, for a known geometry, and for different Z positions, of the particle, is obtained after FEM analysis as discussed below. The value of 'P' is known for different position of the particle, in the vertical direction for a known geometry, and it should be noted that the impedance value is independent in the Y-direction (The axis is defined in FIG. 7).

Equation 2a is fitted to obtain a fitting coefficient c1, c2, and c3 for a known electrode geometry using least square fit. The electrode width and edge to edge spacing between electrodes is chosen in such a way to give a pronounce effect on the value of 'M' so that the operative vertical position of the particle can be better discriminated.

The another obtained value 'P' equal to 1−M/A2 correlates position of the particle in the 'Z' direction inside the sensor. Here, the Z-direction is defined in the direction of the height of the channel (sensing region). The 'Z' position of the particle can be calculated from the fitting equation:

$$P = c1 + c2\left(\frac{2Z}{H}\right)^2 + c3\left(\frac{2Z}{H}\right)^4$$

Where, 'H' is the height of the channel and 'c1', 'c2' and 'c3' is the fitting parameter.

For a known dimension of the sensor and electrode geometry, the 'c1', 'c2', and 'c3' are the derived parameters from the least square fit which can be calculated after solving Laplace equation and applying appropriate boundary conditions.

The Z-position can be used to calculate diameter of the particle. The amplitude variation of the particle in the said geometry of the channel and the electrode width varies as $$A2 = Gd^3\left(1 + a1\left(\frac{2Z}{H}\right) + a2\left(\frac{2Z}{H}\right)^2\right).$$

Where 'd' is the diameter of the particle.

The value 'A2' and the 'Z' can be used to calculate the diameter of the particle.

The velocity of the particle flowing in the said geometry can be obtained by finding the time difference between two consecutive peaks since the electrical signal are sampled at much higher rate than the transit time of the particle inside the sensing region. The center-to-center distance of the two consecutive electrode is known and therefore the velocity of the particle can be measured easily using the geometry defined herein. The flow inside the channel is parabola which is a function of both Z and Y-coordinate. Here, the 'Y' coordinate is in the direction of the width of the channel. The 'Z' position is obtained in claims 12 and 13 can be used to calculate the 'Y' coordinate using the $$U(X, Y) = \frac{\left[ (Y^2 - 1) + \sum_{n=0}^{\infty} \frac{32(-1)^n \cosh\left\{\frac{(2n+1)\pi A Z}{2}\right\}}{(2n+1)^3 \pi^3 \cosh\left\{\frac{(2n+1)\pi A}{2}\right\}} \times \cos\left\{\frac{(2n+1)\pi Y}{2}\right\} \right]}{M_0}$$

$$M_0 = [-\frac{2}{3} + \sum_{n=0}^{\infty} \frac{128(-1)^n \tanh\left\{\frac{(2n+1)\pi A}{2}\right\}}{A\pi^5(2n+1)^5} \times \sin\left\{\frac{(2n+1)\pi}{2}\right\}$$

Where, $Y = y/L$, $Z = z/l$, $A = l/L$, $U = u/u_m$ and $u_m = \dfrac{\int_0^L \int_0^l u \, dx \, dz}{\int_0^L \int_0^l dx \, dz}$ Where '2L' is the width of the sensing region and '2l' is the height of the channel.

The center of the coordinate is at the geometric center of the sensing region defined in claim.

Here 'u' is the velocity of the fluid at any location of the defined geometry.

The said defined geometry, of the apparatus of this invention, can be given positive voltage on the first top-electrode and fourth top-electrode and the negative potential on the second top-electrode and the third top-electrode of the same magnitude to obtain the same features (A1, A2, M). All the bottom electrodes are virtually grounded. The current flowing from the first and the third bottom electrode is summed using first summing amplifier and the current flowing from the second and fourth bottom electrode is summed using another summing amplifier. The difference of the output from the two summing amplifier is found using differential amplifier to generate the same characteristics (A1, A2, M).

Figure 4:
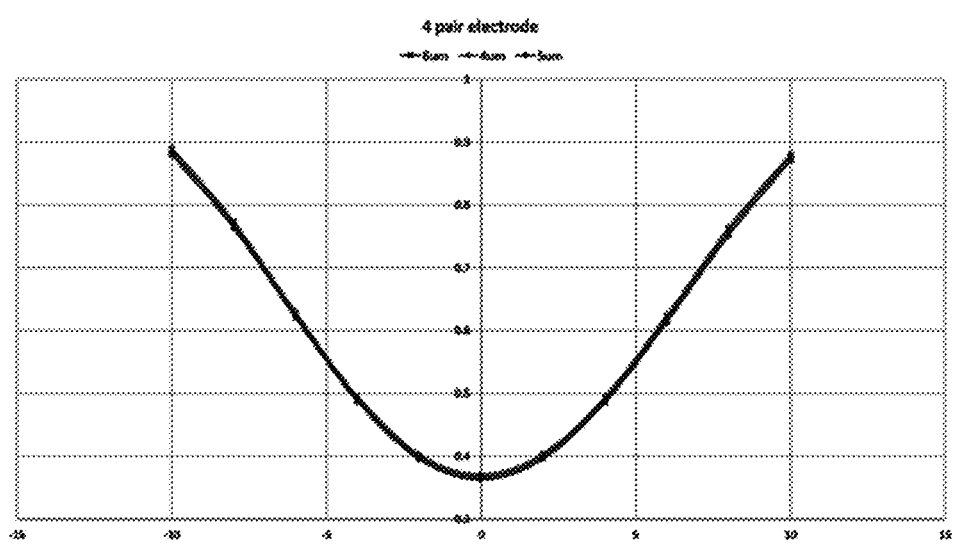
FIG. 4 illustrates the X-axis is the Z position of the particle and the Y-axis is the prominence defined in equation 2 described in the latter section.

FIG. 4 shows the value of 'P' after FEM analysis vs position of the particle in the vertical direction for 4-micron, 5-micron, and 6-micron diameter particle; it clearly indicates that the value of 'P' is dependent only on the vertical position of the particle and least dependent on the size of the particle. The x-axis of the figure is the operative vertical position and the y-axis is the prominence 'P' described in equation 2. The center of the cross section is at (0,0) as shown in FIG. 14.

Equation 2 is used to calculate the vertical position of the particle inside the microfluidic device after obtaining the coefficient c1, c2 and c3 from FEM analysis and least square fit as described above.

Equation 2 is used to calculate the 'Z' position of the particle for a known value of 'M' from the obtained electronic signal and thereafter value of 'Z' is substituted into equation 1 for known value of 'A2' which gives the correct diameter 'd' of the particle. Here 'd' is the diameter of the particle when the particle Z-position is equal to zero.

Figure 6:
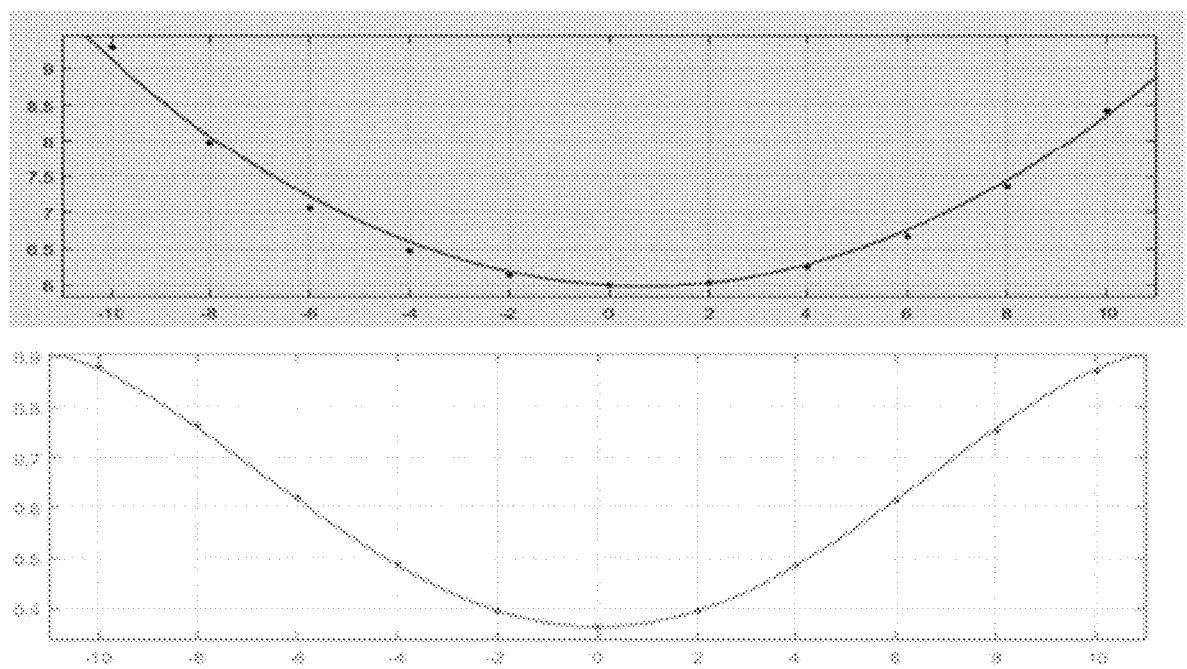
FIG. 6 illustrates that the solid line shows the fitted equation 1 and the 'o' shows the true value of A2 after FEM analysis for different vertical positions (b) The solid line shows the fitted equation 2 and 'o' is the discrete point showing the true value of prominence described in equation 2a after FEM analysis for different vertical positions.

The fitted coefficients of equation 1 and equation 2 are shown in FIG. 5 for 3-microns, 4-microns, and 5-microns size of the particle. The R2 factor, for each curve, clearly indicates that the fitting coefficient can, very well, calculate both, the position in the vertical direction and the diameter of the particle. The coefficients for both the equation for 4-micron, 5-micron, and 6-micron size do not vary much. The fitted equation 1 and 2 and true value of the A2 and P is shown in FIG. 6.

Figure 7:
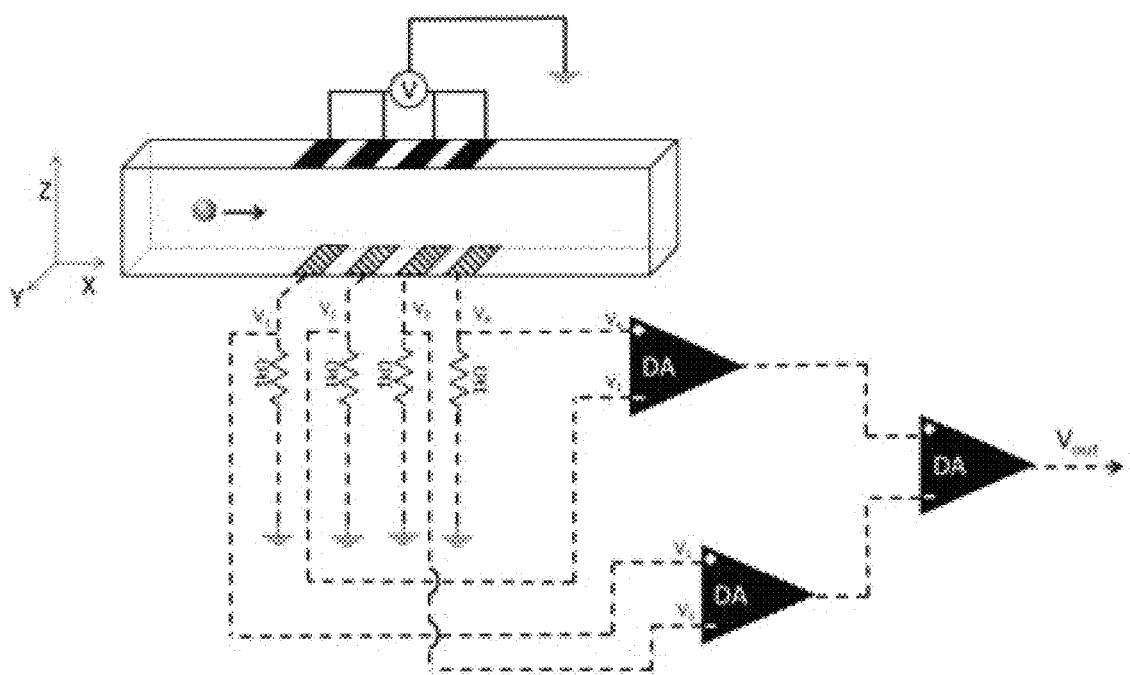
FIG. 7 illustrates difference between the first pair and third pair is found using Differential amplifier and similarly the difference between the fourth pair and the second pair is found.
Figure 12:
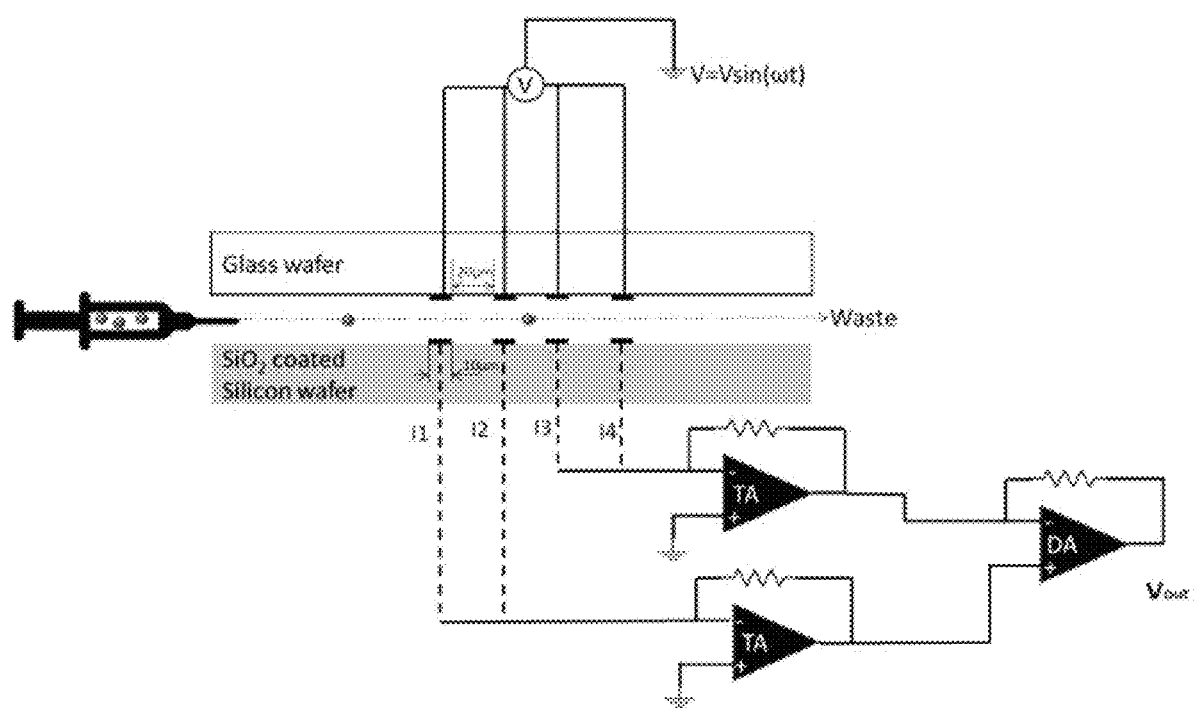
FIG. 12 illustrates that same voltage is applied on the top electrode and the current is summed from the first and second electrode pair using summing amplifiers. The current flowing from the third and the fourth electrode pair is summed using another summing amplifiers. The output from the two summing amplifiers are subtracted using Differential amplifier to give the same output as shown in FIG. 2.

The difference between the current of first pair electrode and third pair electrode of microfluidic apparatus is found using Differential Amplifier (DA) and the difference between the fourth pair and the third pair of microfluidic apparatus is found using another Differential Amplifier shown in FIG. 7. The Resistor 1 k shown in FIG. 7 is connected to ground and the bottom electrode surface which in combination with the electrode pair act as a potential divider but in general the value of resistor can vary. However, the difference in current flowing between first and third and difference in current flowing between fourth and second can also be found using transimpedance amplifier and Differential Amplifier as shown in FIG. 12. Another advantage of using the current electrode configuration is the reduction in the offset voltage arising due to misalignment of top and bottom electrode. The difference in current between first and fourth pair is non-zero. However, the double difference between two different electrode pair will reduce the offset value increasing the sensitivity of the microfluidic apparatus. The factor 'M' shown in FIG. 2 can be increased or decreased depending on the edge to edge spacing between two successive electrodes. Increasing the edge to edge spacing will decrease the 'M' and at much larger edge spacing greater than 5× of the electrode width will isolate each electrode from each other. Here, the isolation means that there is no cross current flow in the alternate electrode.

The reduced edge to edge spacing causes some of the current to flow from top electrode pair to the alternate bottom electrodes. The cross-flow current can be increased by decreasing the edge spacing between two successive electrodes. The current concept is not limited only to four pair electrodes but can be applied to more than four pair of electrodes.

Figure 8:
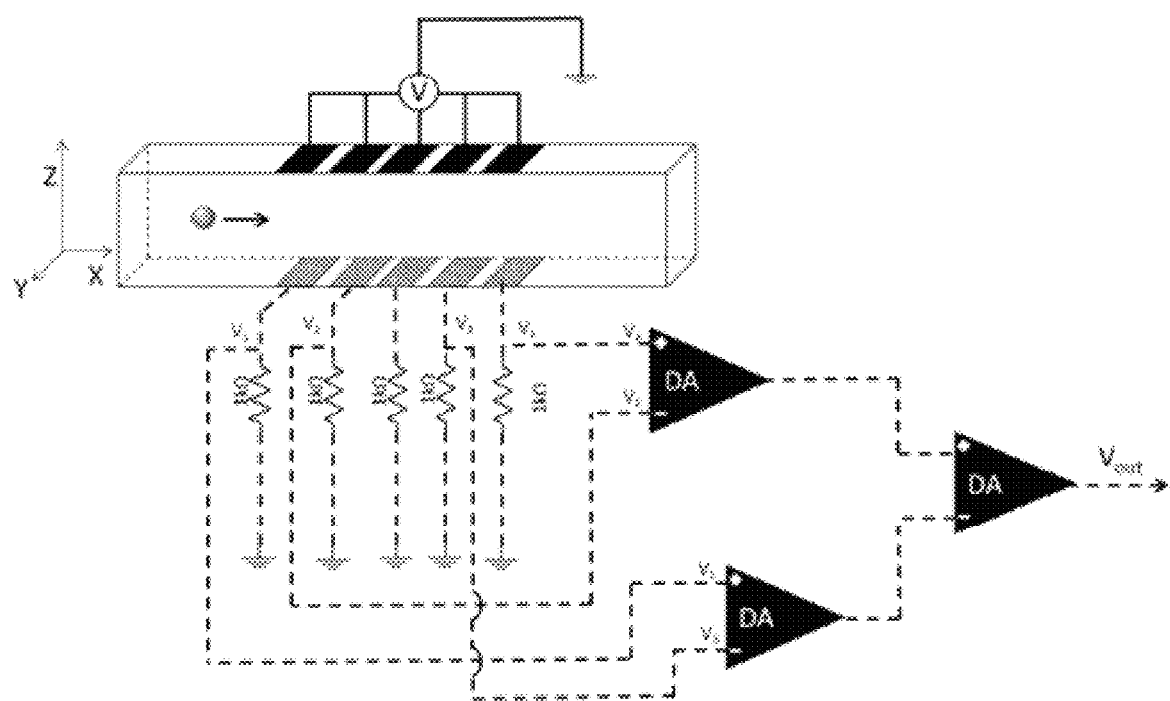
FIG. 8 illustrates a five pairs' electrode showing the concept of electrode wiring and current measurement principle to calculate the Z-position of the particle.

In another embodiment, of the microfluidic apparatus, of this invention, five pairs of electrodes are used as shown in FIG. 8. The center electrode is connected to a 1 k Resistor which is grounded. The impedance signal of the particle is calculated using a wiring scheme as shown in the figure. The fitted coefficient, for both the equation 1 and equation 2, for the given geometry, is shown in FIG. 9. The impedance signal shown in FIG. 2 is for a single frequency; but, in general, summation of frequencies can be applied on the electrode surface and the concept is not limited to a single frequency. The current art not only gives the information of particle position in the Z direction but also increases sensitivity of the whole system; thus, enabling the microfluidic apparatus to measure particle of sizes less than 1 micron in relatively more wider channels.

The electrode dimension and spacing is known for the current apparatus, the transit time between two peaks can be calculated from the known signal sampling rate. The two information data items, for the current microfluidic apparatus, can be used to calculate velocity of the particle. The velocity, inside the hard-microfluidic channel, is a parabolic velocity profile. The equation 3 can be used for the current apparatus to calculate the y-position of the particle.

Another application, of the current invention's apparatus, is to find the position of the particle both in Y and Z direction which can give useful insights for scientific study of particle dynamics and, therefore, can be alternative for particle image velocimetry instrument which is a very costly instrument.

Figure 10:
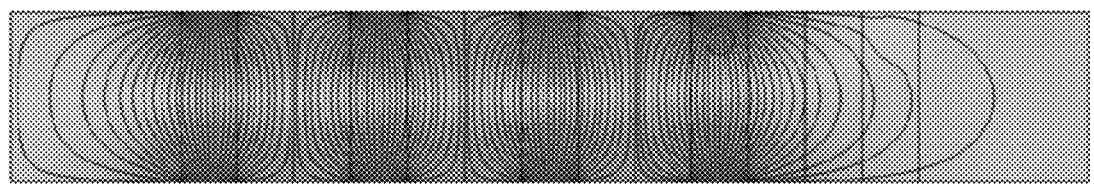
FIG. 10 illustrates current density field lines for the four pairs' electrode apparatus system. The current density at fourth-electrode pair shows a change when particle is between the fourth pair.

The equation 2 relating P to the height of the particle will be different for different geometries of the electrode. However, for a known geometry, the equation 2 will always be least dependent on the size of the particle provided the volume of the detection chamber is far greater than the volume of the particle. The current density lines, of the apparatus, of the current invention, are shown in FIG. 10; the two extreme electrodes show symmetrical behavior and the two middle electrodes show symmetrical behavior. The current microfluidic apparatus has same current density lines for the middle two electrode pair and same current density for the extreme two electrode pair. However, the current density is not same for all the electrode pairs. The four pair electrode system may not show better sensitivity because of asymmetric field line behavior. However, the sensitivity is better than the first prior art citation.

Figure 11:
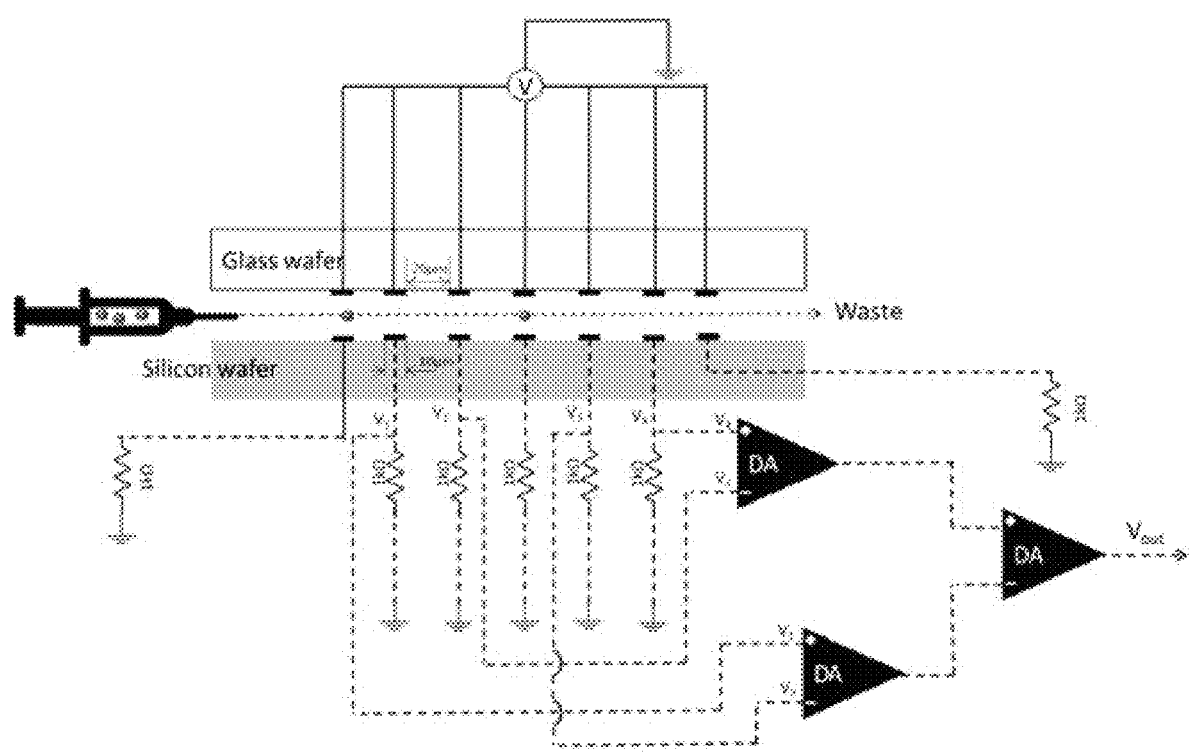
FIG. 11 illustrates a seven pairs' electrode system showing the electronic setup impedance measurement of the particle. The inner five electrode pairs are used for measurement.

In another embodiment of the current invention, there is provided an eight pair electrode system which is used to improve the sensitivity and the impedance correction arising due to different position of the particle in the Z-direction. Increasing the number of electrodes will make the field lines more symmetrical for inner 4 electrodes shown in FIG. 11. The advantage of the current system is reduction in the offset voltage arising due to misalignment of the electrode and variation in the electrode geometry, making the offset close to zero.

In another embodiment, the electronic measurement scheme is employed shown in FIG. 12 for the impedance measurement of the particle using summing amplifier. The positive sinusoidal voltage is applied on the top electrodes as shown in FIG. 12. The current flowing from bottom first two electrodes is added using a first summing amplifier. The current flowing from fourth bottom electrode and the third bottom electrode is summed using a second summing amplifier. The output from the two summing amplifiers (first and second) is subtracted using a differential amplifier as shown in FIG. 12. The same measurement scheme can be applied to five pair electrodes' apparatus also.

In another embodiment of the current electronic measurement system, a combination of frequencies is applied. The applied voltage can be $V \sin(\omega_1 t) + V \sin(\omega_2 t) + V \sin(\omega_3 t) + \ldots V \sin(\omega_n t)$. Where $\omega_1$, $\omega_2$, $\omega_3$ and $\ldots \omega_n$ is the angular sinusoidal frequency applied on the top electrode.

In at least an embodiment, the electronic apparatus, with multiple electrodes, is connected to an input voltage signal, the input voltage signal is generated from the lock-in board and the output signal coming from the differential amplifier is fed to the input of a lock-in amplifier for demodulation required for impedance measurement at different frequencies. The impedance signal is modulated with carrier frequency, the carrier frequency is the applied voltage to the electrode with sinusoidal frequency on top of the electrode. The output coming from the DA is the modulated signal carrying the impedance signal of the particle and the carrier frequency.

The demodulation of the signal is done using the lock-in amplifier instrument to obtain impedance values at each applied frequency applied to the top electrode. The sinusoidal voltage applied to the top electrode is generated from the lock-in amplifier board. The current difference between two electrode pair is:

$$\left( \frac{V \sin(\omega_1 t) + V \sin(\omega_2 t) + V \sin(\omega_3 t) + \ldots V \sin(\omega_n t)}{Z^2} \right) \Delta Z.$$

Where $\Delta Z$ is the impedance change due to presence of the particle between two electrodes and Z is the impedance of the conductive solution. The variation in $\Delta Z$ depends on the volume, conductivity, and permittivity of the particle. The summation of the voltage sinusoidal signal will be applied to all the electrode top surface but not only to individual electrode surface. It may be noted that lower frequency applied to the electrode reveals information about the size of the cell and the higher frequency applied to the electrode surface reveals information regarding the permittivity of the cell membrane. The output signal shown in FIGS. 7, 8, and 12 can be expressed in the below equation 4:

$$\frac{V \sin(\omega t) \Delta Z(t)}{Z^2} \qquad (4)$$

Here '$\omega$' is the carrier angular frequency and $\Delta Z(t)$ is the impedance signal due to particle. The $\Delta Z(t)$ signal can be obtained by multiplying the above output signal with the carrier frequency of same phase and then passing the multiplied signal with low pass filter which gives the real part of $\Delta Z(t)$ signal. The imaginary part of $\Delta Z(t)$ signal can be obtained in the same way except that multiplying the signal with 90-degree phase change of the generated carrier frequency.

In at least an embodiment, the said defined geometry, of the apparatus of this invention, can be given positive voltage on the first top-electrode and fourth top-electrode and the negative potential on the second top-electrode and the third top-electrode of the same magnitude to obtain the same features (A1, A2, M). All the bottom electrodes are virtually grounded. The current flowing from the first and the third bottom electrode is summed using first summing amplifier and the current flowing from the second and fourth bottom electrode is summed using another summing amplifier. The difference of the output from the two summing amplifier is found using differential amplifier to generate the same characteristics (A1, A2, M).

In at least an embodiment, the said defined geometry, of the apparatus of this invention, can be given positive voltage on the top of first and second electrode and negative voltage on third and fourth electrode. All the bottom electrode is virtually grounded. The current flowing from the bottom first and bottom fourth electrode is summed using first summing amplifier and the current flowing from the second and third bottom electrode is summed using another summing amplifier. The difference between the output of the two summing amplifier is found using differential amplifier. However, the output generated due to flow of the particle will be first maxima-minima-maxima-minima or first minima-maxima-minima-maxima which is different from other embodiments.

An impedance curve obtained can be fitted with two antisymmetric gaussian $$Ae^{-\left(\frac{x-u1}{sig}\right)^2} - Ae^{-\left(\frac{x-u2}{sig}\right)^2} + Ae^{-\left(\frac{x-u3}{sig}\right)^2} - Ae^{-\left(\frac{x-u4}{sig}\right)^2}$$

where
'sig' is defined here as the width of the peak
'u1', 'u2', 'u3', and 'u4' is the position of extreme values of the impedance curve
'A' is the amplitude of the fitted curve.

The correlation between the two antisymmetric fitted curve and the impedance curve can be obtained. Here, the correlation factor can be used to correlate the signal buried in the noise to improve the counting of the smaller particle which is just above or below the threshold level of the noise.

In at least an embodiment, the said defined geometry, of the apparatus of this invention, has first and second top electrode shorted and third and fourth electrode shorted to provide two different pads for electrical connection. The positive voltage will be applied on the first top and second top electrode using only single contact pads and negative voltage of same magnitude will be provided on third and the fourth electrode using only single contact pads.

In at least an embodiment, the said defined geometry, of the apparatus of this invention, has third bottom and second bottom electrode shorted and first and fourth bottom electrode will have two different contact pads. The configuration has two contact pads for supplying positive and negative voltage and three contact pads for electrical current measurement.

In at least an embodiment, the said defined geometry, of the apparatus of this invention, has carrier signal applied to a top electrode which can be of two different frequencies ranging from 500 kHz to 30 MHz to find the size of the particle as well as the electrical cell membrane properties such as capacitance to distinguish the particle of same size but of different membrane electrical property. One such application is to distinguish the small red blood cells and the platelet which falls in the same size having different electrical membrane property.

In at least an embodiment, the microfluidic apparatus, of this invention, with multiple electrode system has side openings for inlet and outlet fluid flow.

In at least an embodiment, the microfluidic apparatus, of this invention, with multiple electrode system can also have opening from the top side of the system as shown in FIG. 1. However, making hole from the top side requires more lead time and precision laser cutting or mechanical drilling system.

In at least an embodiment, the sensing region of the current invention's apparatus can range from 30 micron to 600 microns in length to incorporate multiple electrode pair. The height of the sensing region can be from 10 micron to 100 microns.

In at least an embodiment, the sensing region of the current invention apparatus can range from 40 micron to 100 microns in width along Y-direction.

In at least an embodiment, the width of the electrode inside the sensing region can vary from 10 microns to 100 microns.

In at least an embodiment, edge to edge spacing between two successive electrodes can vary from 5 micron to 60 microns.

In at least an embodiment, the edge to edge spacing between two successive electrodes can vary from 0.25× to 2× of the electrode width to increase the value of 'M' shown in FIG. 2.

In at least an embodiment, the edge to edge spacing between two successive electrodes may not be same.

In at least an embodiment, the length of the microfluidic impedance sensor is less than 6 mm to reduce the pressure drop.

As discussed before, the current invention's microfluidic apparatus can be used to determine whether the particle is located above the center or below the center. The difference between A1-A2>0 shown in FIG. 2 indicates the particle is below the center. The difference between A1-A2<0 indicates the particle is above the center.

Another application, of the current invention's apparatus, is to differentiate different type of cells of same size but with different membrane permittivity. The current canter can also be employed to count the $E$-$coli$ bacteria and micro-plastics present in the waste water using multiple frequency.

Figure 13:
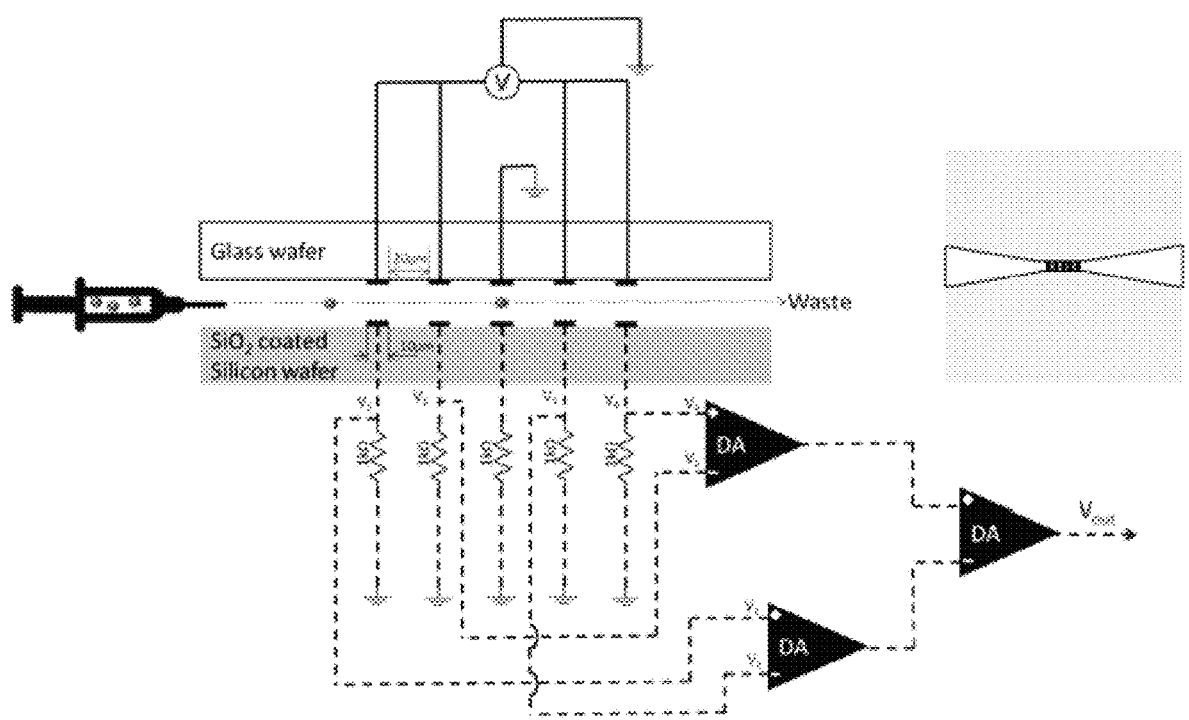
FIG. 13 illustrates a five pairs' electrode system with middle electrode pair grounded.

The concept described earlier can be extended to more advanced system such as shown in FIG. 13 where the edge current density is decreased because of the presence of the ground electrode. The presence of the ground electrode shown in FIG. 13 reduces the impedance variation but does not reduce variation to zero. The current microfluidic apparatus can have multiple ground electrode but only one shown in FIG. 13. The objective of using the ground electrode is to minimize the variation in A1. The position can be inferred from the values of M and A2. Minimizing the variation in A1 is required for the smaller dimension particle because the poor SNR may not give higher 'P' value. (The 'P' value may be suppressed in the noise level).

In at least an embodiment, flow rate of the sample, containing particles, suspended inside the microfluidic apparatus can be constant. Since the flow inside the channel is a parabola and flow rate is known the Y-coordinate of the particle can be calculated using the velocity which is a function of both Y and Z position given in equation 3. The velocity of the particle is known since the electrode dimensions and geometry is known. The time to cross the successive electrode can be found from the location of two peaks when the signal is captured for a fixed known sampling rate. The Y-position calculated from the equation 3 will tell the absolute value of the Y-coordinate but not the true value. This means the particle can be at +Y or −Y position.

According to another aspect of the invention, ratio of A220 MHz/A21 MHz is another important parameter which can give be used to discriminate many different types of cells. The multi dimension frequency-impedance measurement approach can give both the conductivity and the permittivity of the particle after fitting the Maxwell-Wagner equation using least square fit. The obtained value of the conductivity and the permittivity reveals information regarding the membrane wall permittivity and conductivity of the cytoplasm.

In at least an embodiment, the microfluidic apparatus, of this invention, can be a single time use device which can be integrated inside a disposable cartridge used for automatic sample preparation required for Complete blood cell count (CBC). The electrode material used for the current apparatus can be platinum, gold, or silver sputtered on glass wafer or silicon wafer. The wafer is first patterned with electrode and then photo-resist is spin coated on the silicon wafer to make open microfluidic channel. Thereafter, the glass wafer patterned with electrode is aligned and bonded with the silicon wafer to close the open channel.

In at least an embodiment, the microfluidic apparatus, of this invention, can be used to distinguish $E$-$coli$ bacteria from micro-plastics present inside the waste water. The combination of frequencies applied to the top electrode system can differentiate the cells from the hard particles based on difference in permittivity and conductivity of the beads and the $E$-$coli$ bacteria. High frequency, applied to the top electrodes, can penetrate the cell membrane of the bacteria giving better discrimination between beads and the bacteria. The current invention's microfluidic apparatus can be used for continuous in-line measurement of the water quality during water filtration.

In at least an embodiment, the current microfluidic apparatus can be used to distinguish living cells and dead cells using combination of two frequencies or applying more than two frequencies. The current microfluidic apparatus can be used in wine industry to distinguish live and dead yeast present inside the wine during fermentation process. The continuous in-line measurement of live and dead yeast monitors the progress of the fermentation during whole wine or beer production.

In at least an embodiment, of the invention, the microfluidic apparatus can also be used for the counting of the somatic cells present inside the milk. The somatic cell count is the indicator of the milk quality. Greater than 250000/ml of cells present inside the milk indicates the presence of pathogen inside the milk.

In at least an embodiment, the width of the channel can made at least four times greater than its height. The high aspect ratio channel will cause the particle to be focused on the Z=0 plane when suspended inside the viscoelastic fluid. The fluid can be made viscoelastic by addition of PAA (polyacrylic acid) particle with molecular weight greater than 5000 kDa. The viscoelastic focusing reduces the variation in the amplitude A1 and A2 which increases the accuracy of the whole system in measurement of the diameter of the particle.

There apparatus and method, of this invention, is such that position of the particle can be measured and thereafter correction in the diameter of the particle can be made. The advantage of the present invention is the magnitude of the 'M' is much higher than the magnitude of the secondary peak disclosed in the patent 1. Therefore, signal 'M' is of much higher SNR.

Further, the sensitivity of the microfluidic apparatus is improved compared to the second prior art citation.

The electronic measurement system in present invention is less complicated than second prior art which require only voltage source of same phase and same frequency. The invention also discusses how the position of the particle both in 'Y' and 'Z' can measured. The first prior art discloses the art of measuring the position of the particle in the Z-direction by correlating the simulated data after FEM analysis and the experimental raw data. The main disadvantage is it requires huge computation power. However, in the current art the value of 'M', 'A1' and 'A2' can be easily used to find the position of the particle in the Z-direction. The present art is computationally inexpensive.

The use of three differential amplifier reduces the offset voltage arising due to the misalignment of the electrode.

The use of three differential amplifier increases the SNR of the signal by rejecting the common noise present in the same electrode.

The use of more than four electrodes, preferably eight electrodes, uses inner most four electrode which makes the electric field lines more symmetrical compared to the second prior art. The reduction in the offset voltage is much improved compared to second prior art. The present invention is completely different from first prior art and second prior art. The Electric potential will be applied on all eight pair which will give more than six peak values (extreme values) but only inner six peaks (maxima and minima) will be used for finding the peak location.

The TECHNICAL ADVANCEMENT of this invention lies in providing an apparatus, and method, where:
vertical position of the particle can be precisely calculated; and
thereafter, precise volume of the particle can be measured.

Further, the system and apparatus also improve sensitivity of detection for counting particle of size less than 1 micron.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

The invention claimed is:

1. A microfluidic impedance cytometry apparatus, for position determination and impedance measurement of particle/s in a fluid carrying particles, said apparatus comprising:
a microfluidic impedance flow channel for allowing flow of said fluid;
an upstream section configured to channel fluid in a pre-defined direction;
a downstream section configured to channel fluid in a pre-defined direction;
a sensing region configured to receive said channeled fluid, between said upstream section and said downstream section, configured to sense one or more parameters of said fluid, said sensing region comprising one or more sets of pairs of electrodes, each pair forming a current path from an operative top to an operative bottom, each of said pairs being formed by an operative top electrode and an operative bottom electrode, electric potential being applied on said operative top electrode/s, each electrode for a particular pair being parallel-aligned and being symmetric, with respect to each other, same positive electric potential being applied on each of said top electrodes and each of said bottom electrodes is virtually grounded, for a pair;
wherein, edge to edge spacing of adjacent electrode/s is at least 0.5 times of said electrode width but maximum spacing is 5 times of said electrode width;
wherein, width of said channel is at least 1.5 times greater than its height;
a configuration of amplifiers, wherein:
a first summing amplifier configured to add values of current flowing from bottom first electrode and bottom second electrode to obtain a first summation value;
a second summing amplifier configured to add values of current flowing from bottom third electrode and bottom fourth electrode to obtain a second summation value;
a first differential amplifier configured to obtain a first difference value, comprising at least three local maxima and three local minima, over a defined time duration, using said first summation value and said second summation value;
change in current, between electrodes, being a function of position of particle in a vertical direction (Z-direction) and volume of said particle, in said fluid, causing said change in current when said fluid comprising particles pass through said at least a pair of electrodes of said sensing electrodes; and
velocity of the particle being a function of position of particle in a width direction (Y-direction) and in a vertical direction (Z-direction) for a given applied pressure of said fluid.

2. The apparatus as claimed in claim 1 wherein,
each of the bottom electrode being connected to a fixed precision resistor which is grounded to act as potential divider, in that, each pair of electrodes being connected in series with a fixed resistor value which is grounded;
a second differential amplifier being configured to output a second difference value between voltage values of said first pair of electrodes and said third pair of electrodes;
a third differential amplifier being configured to output a third difference value between voltage values of said second pair of electrodes and said fourth pair of electrodes;
a fourth differential amplifier being configured to output a fourth difference value between said second difference value and said third difference value.

3. The apparatus as claimed in claim 1 wherein, said sensing region comprising at least a detection chamber being defined as volume of the region between a top electrode and its corresponding bottom electrode which, together, form a pair of electrodes.

4. The apparatus as claimed in claim 1 wherein, said sets of pairs of electrodes being odd numbers of pairs, in that, a center electrode is grounded.

5. The apparatus as claimed in claim 1 wherein, width of said sensing region being at least 1.5 times of height of said sensing region in order to focus said particle/s in an operative horizontal plane (Z-plane).

6. The apparatus as claimed in claim 1 wherein, width of said channel is 4 times of height of said sensing region in order to align said particles in an operative horizontal plane (Z-plane).

7. The apparatus as claimed in claim 1 contains a fluid which is viscoelastic for focusing the particle/s in a Z-plane.

8. The apparatus as claimed in claim 1 wherein, each of said operative top electrodes being provided on an operative top wall of said apparatus such that said electrode being in communication with said fluid configured to pass through said impedance flow channel.

9. The apparatus as claimed in claim 1 wherein, each of said operative bottom electrodes being provided on an operative bottom wall of said apparatus such that said electrode being in communication with said fluid configured to pass through said impedance flow channel.

10. The apparatus as claimed in claim 1 wherein, each of said electrodes being fabricated by coating of photoresist (SU-8) with platinum electrode deposited on the silicon or the glass wafer and said electrode material being platinum or gold such that they all are in contact with the flowing fluid.

11. The apparatus as claimed in claim 1 wherein, from said three local maxima and three local minima,
   difference between a third extreme value and fourth extreme value gives a first (main) peak value having 'A1' value;
   difference between a first extreme value and a sixth extreme value gives a second peak value having 'A2' value;
   difference between a second extreme value and a fifth extreme value gives a third peak value having 'M' value;
   so that,
      amplitude difference between said 'A1' value and said 'A2' value provides a determination whether particle in said fluid is above or below a center value;
      positive difference between said 'A1' value and said 'A2' value provides a determination that particle in said fluid is above or below a center value; and
      negative difference between said 'A1' value and said 'A2' value provides a determination that particle in said fluid is above or above a center value.

12. The apparatus as claimed in claim 1 wherein, each of said electrodes is connected to an input voltage signal, the input voltage signal being generated from a lock-in board and an output signal coming from said differential amplifier being fed to an input of said lock-in amplifier for demodulation required for impedance measurement at different frequencies, the impedance signal modulated with carrier frequency, the carrier frequency being the applied voltage to the electrode with sinusoidal frequency on top of the electrode, the output of said differential amplifier is the modulated signal carrying the impedance signal of the particle and the carrier frequency, the demodulation of the signal is done using said lock-in amplifier instrument to obtain impedance values at each applied frequency applied to said top electrode/s.

13. The apparatus as claimed in claim 1 wherein, a first top-electrode and a fourth top-electrode being provided positive voltage and a second top-electrode and a third top-electrode being provided negative voltage in order to obtain three local maxima and three local minima.

14. The apparatus as claimed in claim 1 wherein, a first top-electrode and a fourth top-electrode being provided with positive voltage, a second top-electrode and a third top-electrode being provided with negative potential of the same magnitude, all bottom electrodes being virtually grounded, in that, current flowing from the first bottom electrode and the third bottom electrode is summed using a first summing amplifier and current flowing from the second bottom electrode and the fourth bottom electrode is summed using another summing amplifier, and difference of the output from the two summing amplifier is found using a differential amplifier to generate output values relating to:
   minima-maxima-minima,
   maxima-minima-maxima, and/or
   maxima-minima-maxima-minima-maxima-minima,
   in that, said output value/s having increased sensitivity to provide position of particle and to provide impedance correction.

15. The apparatus as claimed in claim 1 wherein, a first top-electrode and a second top-electrode being provided positive voltage and a third top-electrode and a fourth top-electrode being provided negative voltage, with all bottom electrodes connected to resistors or virtually grounded for measurement of summation of current flowing in first bottom electrode and fourth bottom electrode and for measurement of summation of current flowing in the second first bottom electrode and third bottom electrode and thereafter the two summed currents are subtracted using the difference amplifier to generate output values relating to:
   maxima-minima-maxima-minima,
   minima-maxima-minima-maxima,
   in that, said output value/s increasing limit of detection.

16. The apparatus as claimed in claim 1 wherein, a first top-electrode and a second top-electrode being shorted with a positive voltage applied on said first top-electrode and said second top-electrode, using only single contact pads, and a third top-electrode and a fourth top-electrode being provided two different pads for electrical connection, said third top-electrode and a fourth top-electrode being provided with same magnitude negative voltages using only single contact pads.

17. The apparatus as claimed in claim 1 wherein, said third bottom-electrode and said second bottom-electrode being shorted and said first bottom-electrode and said fourth bottom-electrode having two different contact pads for and a total of three contact pads for electrical current measurement, in that, all bottom electrodes are either virtually grounded or connected to resistor.

18. The apparatus as claimed in claim 1 wherein, at least one of said operative top electrodes being applied with a carrier signal having at least two different frequencies ranging from 500 kHz to 30 MHz to find the size of the particle as well as the electrical cell membrane properties such as capacitance to distinguish particles of same size but having different membrane electrical properties.

19. The apparatus as claimed in claim 1 wherein, said apparatus having eight pair of electrodes where four innermost symmetric pairs of electrodes being utilized for measurement.

* * * * *